(12) United States Patent
Motokawa (10) Patent No.: US 10,099,572 B2
(45) Date of Patent: Oct. 16, 2018

(54) BATTERY BLOCK WITH EXTERNAL GUIDING MEMBER RECEIVING A RAIL

(71) Applicant: SANYO ELECTRIC CO., LTD., Osaka (JP)

(72) Inventor: Shinya Motokawa, Osaka (JP)

(73) Assignee: SANYO ELECTRIC CO., LTD., Osaka (JP)

( * ) Notice: Subject to any disclaimer, the term of this patent is extended or adjusted under 35 U.S.C. 154(b) by 554 days.

(21) Appl. No.: 14/423,075

(22) PCT Filed: Sep. 27, 2012

(86) PCT No.: PCT/JP2012/006190
§ 371 (c)(1),
(2) Date: Feb. 20, 2015

(87) PCT Pub. No.: WO2014/049653
PCT Pub. Date: Apr. 3, 2014

(65) Prior Publication Data
US 2015/0224893 A1   Aug. 13, 2015

(51) Int. Cl.
*H01M 2/10* (2006.01)
*B60L 11/18* (2006.01)

(52) U.S. Cl.
CPC ....... *B60L 11/1877* (2013.01); *B60L 11/1879* (2013.01); *H01M 2/1077* (2013.01); *H01M 2220/20* (2013.01); *Y02T 10/705* (2013.01); *Y02T 10/7011* (2013.01)

(58) Field of Classification Search
CPC ............ H01M 2/1077; H01M 2220/20; B60L 11/1877
USPC ........................................................ 429/99
See application file for complete search history.

(56) References Cited

U.S. PATENT DOCUMENTS

| 4,994,940 A * | 2/1991 | Thouvenin .......... H01M 2/1077 361/692 |
| 2009/0239137 A1 | 9/2009 | Kakuchi et al. |
| 2011/0221384 A1* | 9/2011 | Scheucher ............... B60L 8/00 320/101 |
| 2012/0326665 A1* | 12/2012 | Yin ..................... B60L 11/1801 320/109 |

FOREIGN PATENT DOCUMENTS

| JP | 10-106520 A | 4/1998 |
| JP | 2008-071638 A | 3/2008 |
| JP | 2009-231126 A | 10/2009 |
| JP | 2010-232102 A | 10/2010 |
| JP | 2010-257735 A | 11/2010 |

OTHER PUBLICATIONS

International Search Report issued in PCT/JP2012/006190, dated Nov. 6, 2012, with English translation.

* cited by examiner

*Primary Examiner* — Gary Harris
(74) *Attorney, Agent, or Firm* — McDermott Will & Emery LLP (57) ABSTRACT

Each battery block is formed by a plurality of unit cells arranged. Coupling a plurality of battery blocks with each other forms a battery module. Guiding members, through which a rail is made to pass, is provided on an external surface of the battery block, where the rail is used to couple the battery block with another battery block. The guiding members are provided on at least two adjacent lateral faces of four lateral faces excluding electrode faces of the battery block.

4 Claims, 7 Drawing Sheets

BATTERY BLOCK WITH EXTERNAL GUIDING MEMBER RECEIVING A RAIL

RELATED APPLICATIONS

This application is the U.S. National Phase under 35 U.S.C. § 371 of International Application No. PCT/JP2012/006190, filed on Sep. 27, 2012, the disclosure of which Application is incorporated by reference herein.

TECHNICAL FIELD

The present invention relates to a battery block including a plurality of unit cells.

BACKGROUND TECHNOLOGY

In recent years, hybrid vehicles (HV), plug-in hybrid vehicles (PHV) and electric vehicles (EV) are finding wider use. Secondary batteries (cells) or rechargeable batteries are installed in these environment-friendly vehicles as key devices. As an in-vehicle secondary battery, a nickel hydride battery (cell) and a lithium ion battery (cell) are mainly in use. Since the lithium-ion has a high energy density and has no memory effect, it is anticipated that the spread of the lithium-ion is accelerated in years to come.

In order to achieve high output and large capacity, the in-vehicle secondary battery is used such that a plurality of unit cells are connected adjacently to each other. Normally, the in-vehicle secondary battery is provided as a battery pack where a plurality of battery blocks are coupled together. Here, in each of the plurality of battery blocks, a plurality of unit cells are arranged.

RELATED ART DOCUMENTS

Patent Documents

[Patent Document 1] Japanese Unexamined Patent Application Publication No. 2010-232102.

DISCLOSURE OF THE INVENTION

Problems to be Solved by the Invention

While the vehicle is moving, vibration is applied to the battery pack in the in-vehicle secondary battery. Thus, a rigid packaging is demanded. To effectively use a space inside the vehicle for the installation of the in-vehicle secondary battery, it is demanded that the packaging has an optimal shape for each vehicle type. Where the battery pack is formed or constructed such that a plurality of battery blocks are coupled together and are housed in a casing, the shape of the battery pack is restricted by the shape of the casing.

The present invention has been made in view of foregoing circumstances, and a purpose thereof is to provide a technology for realizing a packaging for the secondary batteries that is rigid and highly flexible in combination of shape.

Means for Solving the Problems

In order to resolve the above-described problems, a battery block according to one embodiment of the present invention is formed by a plurality of unit cells arranged. A guiding member, through which a rail is made to pass, is provided on an external surface of the battery block; the rail is used to couple the battery block with another battery block.

EFFECT OF THE INVENTION

The present invention realizes a packaging, for the secondary batteries, which is rigid and highly flexible.

MODES FOR CARRYING OUT THE INVENTION

Figure 1:
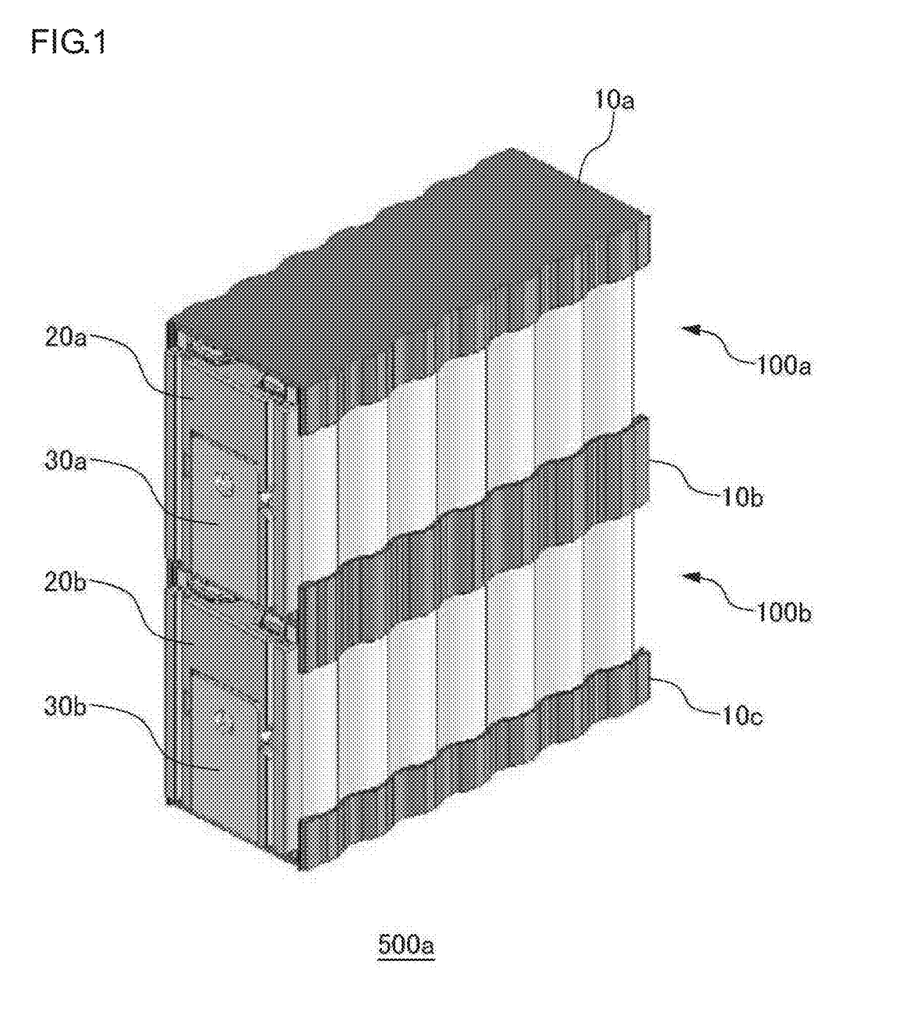
FIG. 1 is a perspective view showing a structure of a battery module according to a comparative example.

FIG. 1 is a perspective view showing a structure of a battery module (cell module) 500a according to a comparative example. The battery module 500a shown in FIG. 1 is formed such that two battery blocks 100, which are a first battery block 100a and a second battery block 100b, are coupled to each other. A description is given hereunder of the structure of each battery block. The battery blocks 100 are arranged such that a plurality of not-shown unit cells are aligned in a cathode direction. Each unit cell is a cylindrical secondary battery (cell), and power generation elements are housed in a battery casing. Each unit cell has a cathode and an anode. The cathode is provided in one of two end surfaces disposed counter to each other, and the anode is provided in the other thereof. The cathodes in each unit cell are connected by a cathode plate, and the anodes are connected by an anode plate. Thereby, a plurality of unit cells are electrically connected in parallel with each other.

As described above, the battery block 100 is constructed in a rectangular parallelepiped shape. External electrode terminal members are placed on two of four faces of the battery block 100 excluding a pair of two faces, opposite to each other, on which the cathode plate and the anode plate are arranged. Another pair of two faces, opposite to each other, where the external electrode terminal members are placed, have relatively small areas. These two faces with the electrode terminal members placed thereon are disposed opposite to each other and each face has a relatively small area. A cathode external terminal member is placed on one of these two faces, and an anode external terminal member is placed on the other. These two faces are hereinafter called electrode faces or electrode surfaces.

With reference to FIG. 1, a lid member 20a is provided on the electrode face of the first battery block 100a. Though not shown in FIG. 1, a similar lid member is provided on an electrode surface opposite to the aforementioned electrode surface. A cathode external terminal member 30a is embedded in an external surface of the lid member 20a. The cathode external terminal member 30a is formed integrally with the aforementioned cathode plate in an L-shape. It suffices that the lid member 20a and the cathode external terminal member 30a are electrically connected to each other, and they may be physically made of different materials from each other.

The first battery block 100a and the second battery block 100b shown in FIG. 1 are depicted in a direction such that the cathode of each unit cell faces downward and such that the anode thereof faces upward. An anode external terminal member is embedded in an external surface of the lid member disposed on the electrode face opposite to an electrode face where the cathode external terminal member 30a is provided. The anode external terminal member is formed integrally with the aforementioned anode plate in an L-shape.

The structures and arrangements of a lid member 20b, a cathode external terminal member 30b, another lid member provided on an electrode surface of the opposite side, and an anode external terminal member of the second battery block 100b are similar to those of the first battery block 100a, respectively. Thus, the repeated explanation thereof is omitted here.

A first bracket 10a has a planar portion and gripper portions extending vertical from two longitudinal sides of the planar portion. The first bracket 10a is fitted to the first battery block 100a in such a manner as to hold a surface where the aforementioned anode plate of the first battery block 100a is arranged. A second bracket 10b has a planar portion and gripper portions extending vertical from two longitudinal sides of the planar portion, too. The gripper portions of the first bracket 10a extend in one direction from the planar portion, whereas the gripper portions of the second bracket 10b extend in two opposite directions therefrom.

The second bracket 10b is fitted to the first battery block 100a and the second battery block 100b in such a manner as to hold a surface where the aforementioned anode plate of the second battery block 100b is arranged, while a surface where the aforementioned cathode plate of the first battery block 100a is arranged is being held by the second bracket 10b. The shape of the third bracket 10c is the same as that of the first bracket 10a. The third bracket 10c is fitted to the second battery block 100b in such a manner as to hold a surface where the aforementioned cathode plate of the second battery block 100b is arranged.

Bus bars (not shown in FIG. 1) are used to connect between the cathode external terminal members and between the anode external terminal members, so that the first battery block 100a and the second battery block 100b can be electrically connected in parallel with each other.

Figure 2:
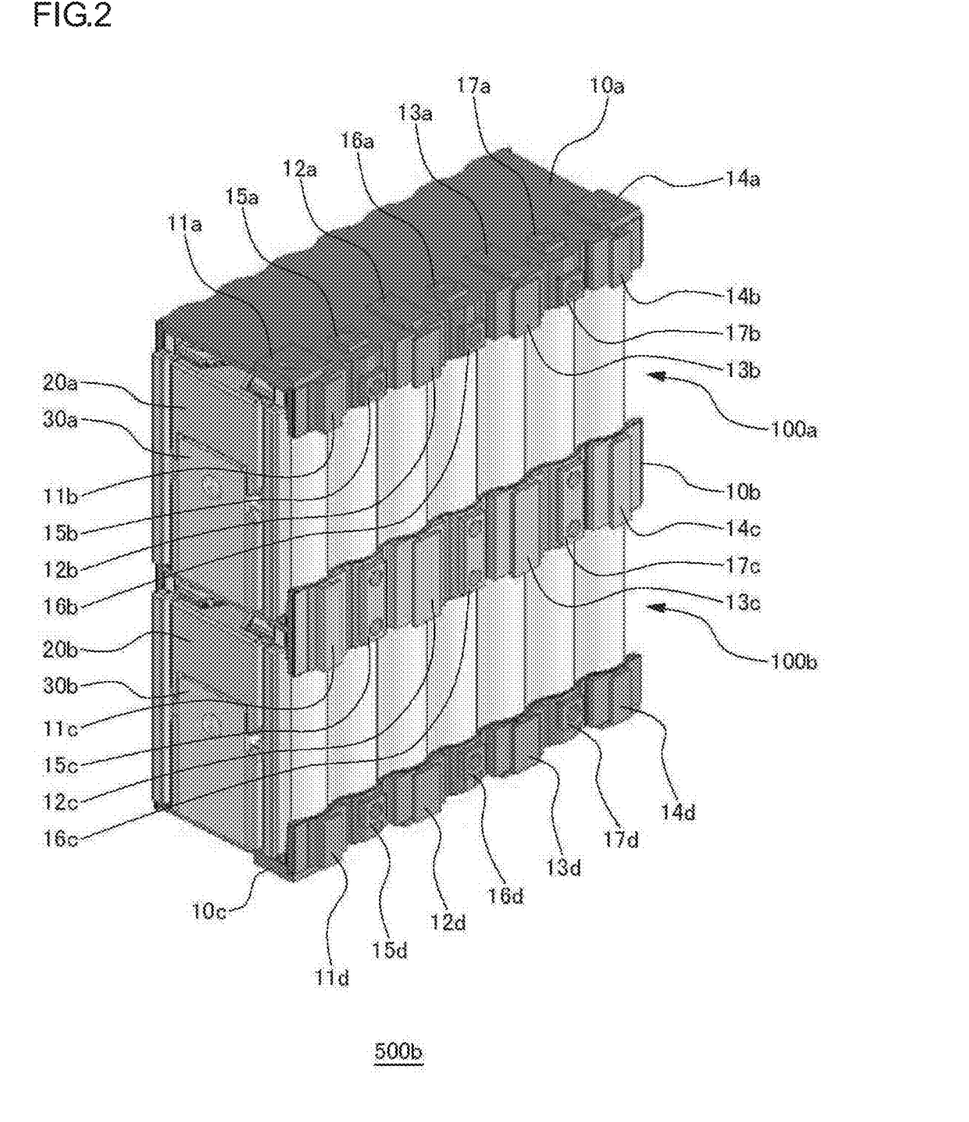
FIG. 2 is a perspective view showing a structure of a battery module according to an embodiment of the present invention.

FIG. 2 is a perspective view showing a structure of a battery module 500b according to an embodiment of the present invention. In the embodiment of the present invention, guiding members, through which rail members are made to pass, are provided in an external surface of the battery block 100. Here, the rail member is used to couple a battery block 100 with another battery block 100. The rail member as used herein is a DIN (Deutsche Industrie Normen) rail. The DIN rail is such that a plurality of mounting holes are formed at equally spaced intervals in a longitudinal direction.

The guiding members through which the DIN rails are made to pass are provided in two lateral surfaces, at least in contact with corners, among four surfaces (hereinafter referred to as "lateral surfaces (faces)" also) excluding the electrode faces of the battery block 100. The guiding members are provided in an orientation such that the DIN rails pass through in a direction parallel to the electrode surface on each lateral surface where the guiding member is installed. Also, the guiding members are provided in the positions along a single plane parallel to the electrode surface on each lateral surface where the guiding member is installed.

In the example shown in FIG. 2, the guiding members, through which three DIN rails are made to pass in a short direction so as to be fixed, are provided in an external surface of the planar portion of the first bracket 10a. More specifically, provided are an L-shaped 1-1st guiding member 11a, a T-shaped 1-2nd guiding member 12a, a T-shaped 1-3rd guiding member 13a, and an L-shaped 1-4th guiding member 14a. Here, the L-shaped 1-1st guiding member 11a has a space or slit for containing one side edge of a DIN rail. The T-shaped 1-2nd guiding member 12a has a space or slit for containing the other side edge of said DIN rail and a space or slit for containing the other side edge of another DIN rail. The T-shaped 1-3rd guiding member 13a has a space or slit for containing the other side edge of said DIN rail and one side edge of another DIN rail and a space or slit for containing the other side edge of another DIN rail. The L-shaped 1-4th guiding member 14a has a space or slit for containing the other side edge of said other DIN rail. The 1-1st guiding member 11a and the 1-4th guiding member 14a have screw holes used to secure plate-type mounting members 300 described later (see FIGS. 4A and 4B) by fastening the screws.

The 1-1st guiding member 11a, the 1-2nd guiding member 12a, the 1-3rd guiding member 13a, and the 1-4th guiding member 14a are arranged at equally spaced intervals along a straight line in the longitudinal direction. A 1-1st supporting member 15a, which is used to secure the DIN rail, is provided between the 1-1st guiding member 11a and the 1-2nd guiding member 12a. The 1-1st supporting member 15a has a hole through which the DIN rail is secured by a screw. Similarly, a 1-2nd supporting member 16a, which is used to secure the DIN rail, is provided between the 1-2nd guiding member 12a and the 1-3rd guiding member 13a. A 1-3rd supporting member 17a, which is used to secure the DIN rail, is provided between the 1-3rd guiding member 13a and the 1-4th guiding member 14a. The 1-2nd supporting member 16a and the 1-3rd supporting member 17a each has a hole through which the DIN rail is secured by a screw. A plurality of these guiding members and a plurality of these supporting members arranged on a straight line are provided on side edges of the planar portion of the first bracket 10a along the longitudinal side.

On an external surface of the gripper portion in contact with the aforementioned side edges of the first bracket 10a, a 2-1st guiding member 11b, a 2-1st supporting member 15b, a 2-2nd guiding member 12b, a 2-2nd supporting member 16b, a 2-3rd guiding member 13b, a 2-3rd supporting member 17b, and a 2-4th guiding member 14b are arranged, in this order, in the longitudinal direction. The respective structures of the 2-1st guiding member 11b, the 2-1st supporting member 15b, the 2-2nd guiding member 12b, the 2-2nd supporting member 16b, the 2-3rd guiding member 13b, the 2-3rd supporting member 17b, and the 2-4th guiding member 14b are approximately the same as those of the 1-1st guiding member 11a, the 1-1st supporting member 15a, the 1-2nd guiding member 12a, the 1-2nd supporting member 16a, the 1-3rd guiding member 13a, the 1-3rd supporting member 17a, and the 1-4th guiding member 14a, respectively. Each member provided on the planar portion of the first bracket 10a and each member provided on the gripper portion thereof are positioned along a single plane parallel to the electrode surface. Thus, the pitches between each member are equal in the planar portion and the gripper portion.

On an external surface of the gripper portion of the second bracket 10b, a 3-1st guiding member 11c, a 3-1st supporting member 15c, a 3-2nd guiding member 12c, a 3-2nd supporting member 16c, a 3-3rd guiding member 13c, a 3-3rd supporting member 17c, and a 3-4th guiding member 14c are arranged, in this order, in the longitudinal direction. The gripper portion of the second bracket 10b that couples the first battery block 100a to the second battery block 100b has the area twice as much as that of the gripper portion of the first bracket 10a or the third bracket 10c. This makes the length of each guiding member and the length of each supporting member in the direction, where the DIN rail passes, twice as long. Consequently, there are two screw holes for each supporting member of the second bracket 10b. Besides the differences described above, the respective structures of the 3-1st guiding member 11c, the 3-1st supporting member 15c, the 3-2nd guiding member 12c, the 3-2nd supporting member 16c, the 3-3rd guiding member 13c, the 3-3rd supporting member 17c, and the 3-4th guiding member 14c are approximately the same as those of the 2-1st guiding member 11b, the 2-1st supporting member 15b, the 2-2nd guiding member 12b, the 2-2nd supporting member 16b, the 2-3rd guiding member 13b, the 2-3rd supporting member 17b, and the 2-4th guiding member 14b, respectively. Each corresponding member provided in the gripper portion of the second bracket 10b and each corresponding member provided in the gripper portion of the first bracket 10a are positioned on the same corresponding straight line. Thus, the pitches between each member are equal in the respective gripper portions.

On an external surface of the gripper portion of the third bracket 10c, a 4-1st guiding member 11d, a 4-1st supporting member 15d, a 4-2nd guiding member 12d, a 4-2nd supporting member 16d, a 4-3rd guiding member 13d, a 4-3rd supporting member 17d, and a 4-4th guiding member 14d are arranged, in this order, in the longitudinal direction. The respective structures of the 4-1st guiding member 11d, the 4-1st supporting member 15d, the 4-2nd guiding member 12d, the 4-2nd supporting member 16d, the 4-3rd guiding member 13d, the 4-3rd supporting member 17d, and the 4-4th guiding member 14d are approximately the same as those of the 2-1st guiding member lib, the 2-1st supporting member 15b, the 2-2nd guiding member 12b, the 2-2nd supporting member 16b, the 2-3rd guiding member 13b, the 2-3rd supporting member 17b, and the 2-4th guiding member 14b, respectively. Each corresponding member provided in the gripper portion of the third bracket 10c and each corresponding member provided in the gripper portion of the second bracket 10b are positioned on the same corresponding straight line. Thus, the pitches between each member are equal in the respective gripper portions. Though not depicted in FIG. 2, guiding members and supporting members are also provided on the external surface of the planar portion of the third bracket 10c, similarly to the external surface of the planar portion of the first bracket 10a.

Though not depicted in FIG. 2, a plurality of guiding members and a plurality of supporting members described so far may be provided on the opposite side as well. An example is shown in FIG. 2 where the guiding members and the supporting members, through which three DIN rails are made to pass, are provided. Instead, those through which one, two, four or more DIN rails are made to pass, may be provided.

Figure 3:
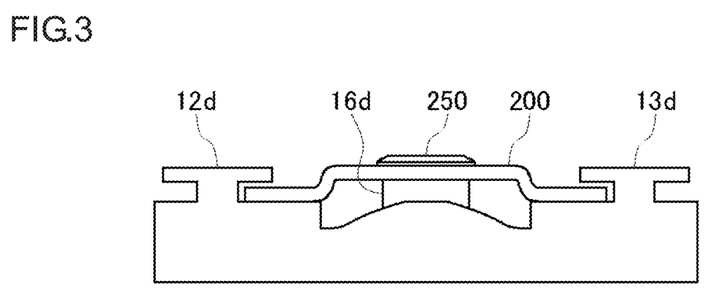
FIG. 3 is a cross sectional view of a 4-2nd guiding member, a 4-2nd supporting member and a 4-3rd guiding member as viewed in a direction through which a DIN rail passes.

FIG. 3 is a cross sectional view of the 4-2nd guiding member 12d, the 4-2nd supporting member 16d and the 4-3rd guiding member 13d as viewed in a direction through which the DIN rail passes. Both side edges (both ends) of a DIN rail 200 are respectively fitted into a recess formed in the 4-2nd guiding member 12d and a recess formed in the 4-3rd guiding member 13d. Any one of a plurality of mounting holes formed in the DIN rail 200 is aligned to the screw hole formed in the 4-2nd supporting member 16d. Then a screw 250 is inserted into the thus aligned holes so as to be fastened. Thereby, the DIN rail 200 and the third bracket 10c are secured.

A description is now given of examples where larger battery modules are formed based on the battery module 500b, which is formed by the two battery block shown in FIG. 2, serving as a building unit.

Figure 4A:
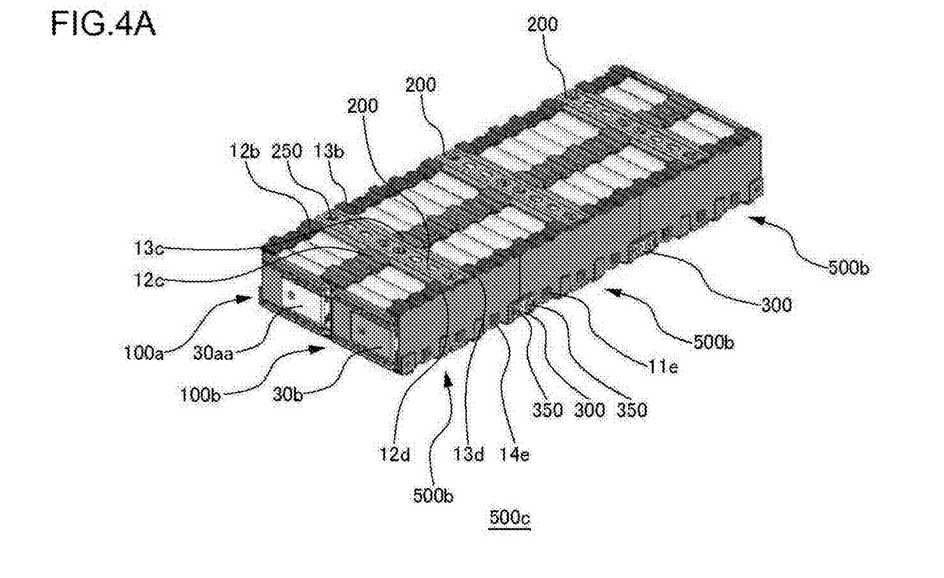
FIGS. 4A and 4B are each a perspective view showing a structure of another battery module formed such that the battery module shown in FIG. 2 is provided in plurality and a plurality of them are coupled together.
Figure 4B:
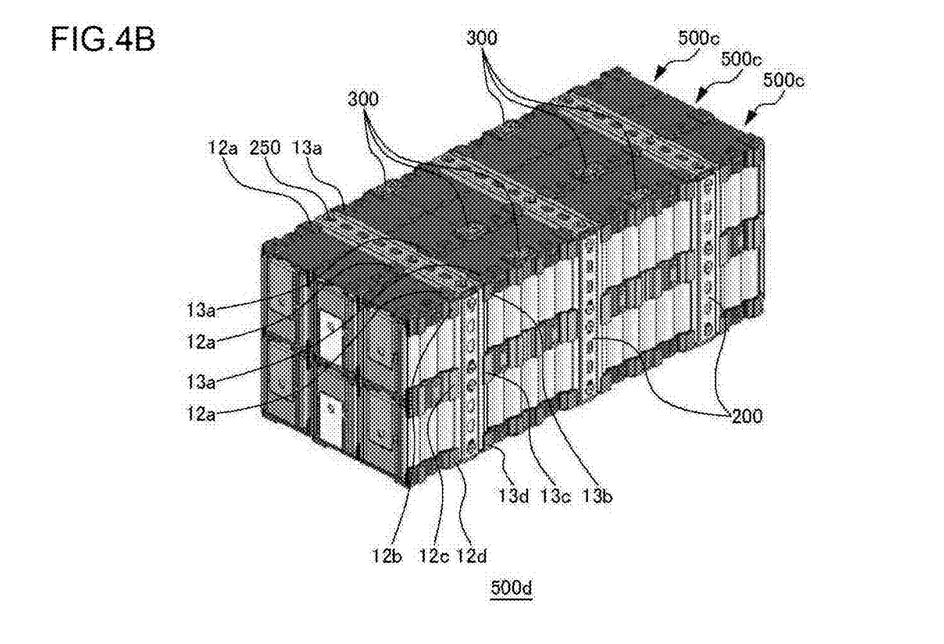

FIGS. 4A and 4B are perspective views showing structures of another battery module 500c and another battery module 500d, respectively. Here, the battery modules 500c and 500d are each formed such that the battery module 500b shown in FIG. 2 is provided in plurality and then a plurality of them are coupled together. FIG. 4A shows a battery module 500c formed when the three battery modules 500b shown in FIG. 2 are coupled together. In other words, the battery module 500c is constructed such that the total of six battery blocks are coupled together. In an example shown in FIG. 4A, the polarities of the electrode faces coplanar with the first battery block 100a and the second battery block 100b are reversed. In FIG. 4A, an anode external terminal member 30aa of the first battery block 100a and a cathode external terminal member 30b of the second battery block 100b are provided on a plane in the same direction.

The electrode face of two-coupled battery module 500b shown in FIG. 2 and that of another two-coupled battery module 500b are coupled together by welding. In so doing, the electrode faces having different polarities are coupled by welding. In FIG. 4A, the cathode external terminal member of the first battery block 100a in the two-coupled battery module 500b in front are coupled to the anode external terminal member of the first battery block 100a in the two-coupled battery module 500b in the middle. And the anode external terminal member of the second battery block 100b in the two-coupled battery module 500b in front are coupled to the cathode external terminal member of the second battery block 100b in the two-coupled battery module 500b in the middle. Also, the anode external terminal member of the first battery block 100a in the two-coupled battery module 500b in the middle are coupled to the cathode external terminal member of the first battery block 100a in the two-coupled battery module 500b in the back. And the cathode external terminal member of the second battery block 100b in the two-coupled battery module 500b in the middle are coupled to the anode external terminal member of the second battery block 100b in the two-coupled battery module 500b in the back. The cathode external terminal member of an exposed electrode face of the first battery block 100a and the anode external terminal member of an exposed electrode face of the second battery block 100b in the two-coupled battery module 500b in the back are connected by a bus bar. Thereby, formed is a battery module where the six battery blocks are connected in series with each other.

In FIG. 4A, in each of the two-coupled battery modules 500b, only one guiding mechanism in the middle is used among three DIN-rail guiding mechanisms. For the purpose of further enhancing the rigidity of the two-coupled battery modules 500b, all of the three DIN-rail guiding mechanisms may be used.

One tip of the DIN rail 200 is fixed to an outer end of a lateral surface (hereinafter referred to as "longitudinal lateral surface" also), which is parallel to a lateral surface of a unit cell of the first battery block 100a, by the use of the 2-2nd guiding member 12b, the 2-2nd supporting member 16b and the 2-3rd guiding member 13b. A central portion of the DIN rail 200 is fixed to inner ends of longitudinal lateral surfaces of the first battery block 100a and the second battery block 100b, by the use of the 3-2nd guiding member 12c, the 3-2nd supporting member 16c and the 3-3rd guiding member 13c. The other tip of the DIN rail 200 is fixed to an outer end of a longitudinal lateral surface of the second battery block 100b, by the use of the 4-2nd guiding member 12d, the 4-2nd supporting member 16d and the 4-3rd guiding member 13d.

In the example shown in FIG. 4A, the DIN rails 200 are secured by (i) the 2-2nd supporting member 16b and one screw 250, (ii) the 3-2nd supporting member 16c and two screws 250 and (iii) the 4-2nd supporting member 16d and one screw 250. Though not shown in the FIG. 4A, a longitudinal lateral surface on the opposite side is similarly secured by the DIN rails 200.

Also, two-coupled battery modules 500b, which are adjacently positioned to each other, are coupled by the plate-type mounting member 300 having two mounting holes. Screw holes are formed in the guiding members located at the both ends among a plurality of guiding members provided on a lateral surface (hereinafter referred to as "short lateral surface" also), which is parallel to a top face or a bottom face of each unit cell in each battery block 100. In the example shown in FIG. 4A, a screw hole of a 5-4th guiding member 14e, a screw hole of a 5-1st guiding member 11e, and the two mounting holes of the plate-type mounting member 300 are positioned and aligned. Here, the screw hole of the 5-4th guiding member 14e is formed at an end of a second battery block 100b on a coupling side at an outer short lateral surface of a second battery block 100b; the screw hole of the 5-1st guiding member 11e is formed at an end of a coupling side of an adjacent second battery block 100b at an outer short lateral surface thereof. Then the two screws 350 are inserted into the thus positioned holes so as to be fastened. Though not shown in FIG. 4A, a short lateral surface on the opposite side is similarly coupled by the plate-type mounting member 300.

FIG. 4B shows a battery module 500d formed when the three battery modules 500c shown in FIG. 4A are coupled together. In other words, FIG. 4B shows the battery module 500d formed such that the total of eighteen battery blocks are coupled together. In an example shown in FIG. 4B, the polarities of the electrode faces coplanar with the first battery block 100a are the same as those of the second battery block 100b. Various shapes of bus bars are used, so that arbitrary series circuits, parallel circuits or series-parallel circuits can be configured.

As shown in FIG. 4B, three six-coupled battery modules 500c are arranged side by side. More specifically, six-coupled battery modules 500c, in which three sets of two-coupled battery modules 500b are adjacently positioned to one another, are so arranged side by side that the adjacent longitudinal lateral surfaces thereof come in contact with each other. No DIN rail 200 passes through on the longitudinal lateral surfaces that are in contact with each other. In a short lateral surface of each of the six-coupled battery modules 500c, only one guiding mechanism in the middle is used among three DIN-rail guiding mechanisms. For the purpose of further enhancing the rigidity of the six-coupled battery modules 500c, all of the three DIN-rail guiding mechanisms may be used.

In FIG. 4B, one tip of the DIN rail 200 is fixed to an outer end of a short lateral surface of a six-coupled battery module 500c located in the left back, by the use of the 1-2nd guiding member 12a, the 1-2nd supporting member 16a and the 1-3rd guiding member 13a provided on the short lateral surface of the left-back six-coupled battery module 500c. A central portion of the DIN rail 200 is fixed to a short lateral surface of a six-coupled battery module 500c located in the middle, by the use of the 1-2nd guiding member 12a, the 1-2nd supporting member 16a and the 1-3rd guiding member 13a provided on the short lateral surface of the six-coupled battery module 500c in the middle. The other tip of the DIN rail 200 is fixed to an outer end of a short lateral surface of a six-coupled battery module 500c located at front right, by the use of the 1-2nd guiding member 12a, the 1-2nd supporting member 16a and the 1-3rd guiding member 13a provided on the short lateral surface of the front-right six-coupled battery module 500c. The DIN rails 200 are secured by the 1-2nd supporting member 16b and one screw 250, respectively. Though not shown in the FIG. 4B, a short lateral surface on the opposite side is similarly secured by the DIN rails 200.

Figure 5A:
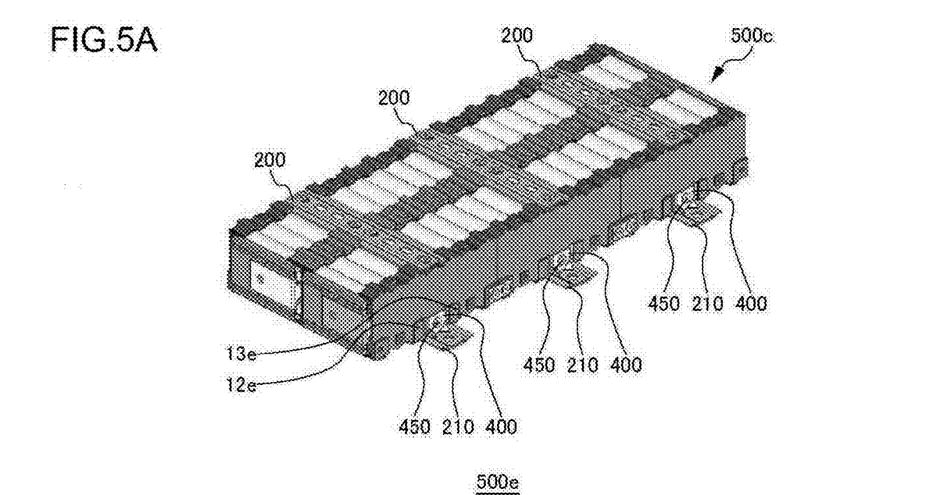
FIGS. 5A and 5B are each a perspective view showing a structure of still another battery module formed such that the two-coupled battery module shown in FIG. 2 is provided in plurality and a plurality of them are coupled together.
Figure 5B:
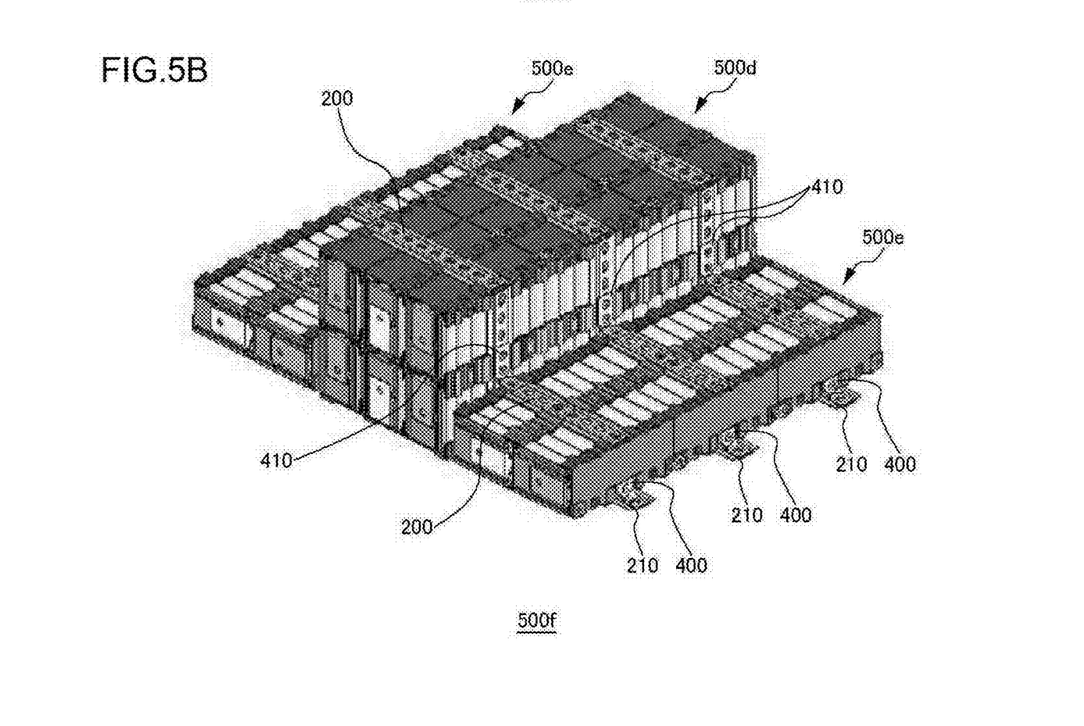

FIGS. 5A and 5B are perspective views showing structures of still another battery module 500e and still another battery module 500f. Here, the battery modules 500e and 500f are each formed such that the two-coupled battery module shown in FIG. 2 is provided in plurality and a plurality of them are coupled together. FIG. 5A shows a modification to the battery module 500c of FIG. 4A. In a battery module 500e, the length of a DIN rail 210 passing through one of longitudinal lateral surfaces (i.e., the lateral surface on the bottom side thereof in FIG. 5A) is greater than the length between the short lateral surfaces. In other words, the DIN rail 210 protrudes externally from the battery module 500e. The location where this longer DIN 210 is used is a longitudinal lateral surface on a side, where the guiding members are provided, in a short lateral surface. An L-shaped mounting member 400 is mounted on a corner formed by a protruding part of the DIN rail 210 and the short lateral surface. The L-shaped mounting member 400 has a mounting hole on each of the two planar portions.

At an outer short lateral surface of each battery block, both side edges (both ends) of a planar portion in contact with a short lateral surface of the L-shaped mounting member 400 are respectively fitted into a recess formed in a 5-2nd guiding member 12e and a recess formed in a 5-3rd guiding member 13e. The mounting hole in the planar portion in contact with the short lateral surface of the L-shaped mounting member 400 is aligned to a screw hole formed in a 5-2nd supporting member 16e and then a screw 450 is inserted into the thus aligned holes so as to be fastened. A not-shown screw is inserted into both a mounting hole in a planar portion in contact with the DIN rail 210 of the L-shaped mounting member 400 and an outermost mounting hole of the DIN rail 210, and is fastened to a not-shown screw hole of the supporting member provided in an installation position of the battery module 500e. In other words, the protruding part of the DIN rail 210 constitutes a mounting part with which the entire battery module 500e is to be secured.

FIG. 5B shows the battery module 500f formed when one battery module 500d shown in FIG. 4B and two battery modules 500e shown in FIG. 5A are coupled together. In other words, FIG. 5B shows the battery module 500f formed such that the total of thirty battery blocks are coupled together. The six-coupled battery module 500e shown in FIG. 5A is placed on each of both longitudinal lateral surfaces of eighteen-coupled battery module 500d shown in FIG. 4B in a manner such that the short lateral surfaces of the six-coupled battery module 500e come in contact with the longitudinal lateral surfaces of the eighteen-coupled battery module 500d.

An L-shaped mounting member 410 is mounted on a corner formed by the DIN rail 200, which is made to pass through on both of the longitudinal lateral surfaces of the eighteen-coupled battery module 500d, and the DIN rail 200, which is made to pass through on the longitudinal lateral surface of the six-coupled battery module 500e. The L-shaped mounting member 410 has two mounting holes in the planar portion, in contact with the DIN rail 200, on the eighteen-coupled battery module 500d side and has one mounting hole in the planar portion, in contact with the DIN rail 200, on the six-coupled battery module 500d side. A specific method of assembling the battery module 500f will be discussed later.

Figure 6A:
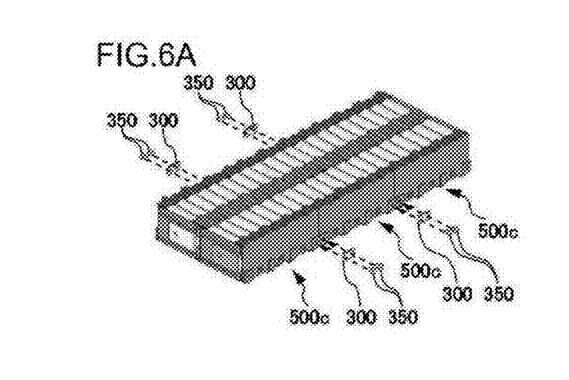
FIGS. 6A to 6D are diagrams for explaining a method for assembling the battery module shown in FIG. 5A.

FIGS. 6A to 6D are diagrams for explaining a method for assembling the battery module 500e shown in FIG. 5A. As shown in FIG. 6A, three sets of two-coupled battery modules (each battery module shown in FIG. 2) are arranged such that the electrodes of each module are in contact with those of adjacent battery module. The two-coupled battery modules 500b, which are adjacently positioned to each other, are coupled by the plate-type mounting member 300. A screw hole of the 5-4th guiding member 14e, a screw hole of the 5-1st guiding member 11e and two mounting holes of the plate-type mounting member 300 are positioned and aligned and are inserted into the two screws 350 so as to be fastened. Here, the screw hole of 5-4th guiding member 14e is formed, in a position closest to a coupling portion, on a short lateral surface of a two-coupled battery modules 500b; the screw hole of the 5-1st guiding member 11e is formed, in a position closest to the coupling portion, on a short lateral surface of an adjacent two-coupled battery modules 500b. A short lateral surface on the opposite side is similarly coupled by the plate-type mounting member 300. In an example shown in FIG. 6A, the total of four positions are coupled by the plate-type mounting members 300.

Figure 6B:
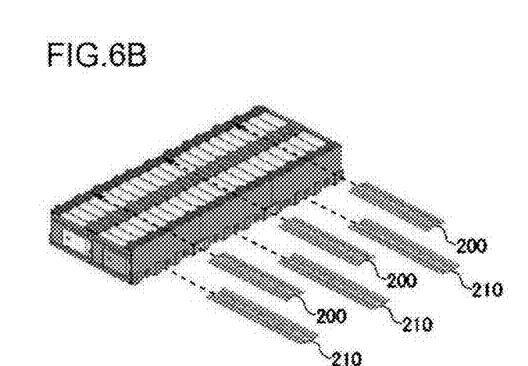

Then, as shown in FIG. 6B, on the longitudinal lateral surfaces of the three sets of two-coupled battery modules 500b, the DIN rails 200 are respectively inserted between the 2-2nd guiding member 12b and the 2-3rd guiding member 13b, between the 3-2nd guiding member 12c and the 3-3rd guiding member 13c, and between the 4-2nd guiding member 12d and the 4-3rd guiding member 13d. Here, the 2-2nd guiding member 12b and the 2-3rd guiding member 13b are hereinafter referred to as a "first set of guiding members" also, the 3-2nd guiding member 12c and the 3-3rd guiding member 13c are similarly called a "second set of guiding members" also, and the 4-2nd guiding member 12d and the 4-3rd guiding member 13d are also similarly called a "third set of guiding members" also. These longitudinal lateral surfaces are to be a top face when the six-coupled battery module 500e is installed. The length of each of the DIN rails 200 that are made to pass through on these longitudinal lateral surfaces is approximately equal to the length between the electrode surfaces. In other words, these DIN rails 200 do not protrude externally from the six-coupled battery module 500e. On the longitudinal lateral surfaces, located opposite to the aforementioned longitudinal lateral surfaces thereof, which are to be a bottom face of the three sets of two-coupled battery modules 500b, the DIN rails 210 whose length is longer than the length between the electrode surfaces are respectively inserted between each of the corresponding first to third sets of guiding members, which have the similar positional relations to those on the top face.

Figure 6C:
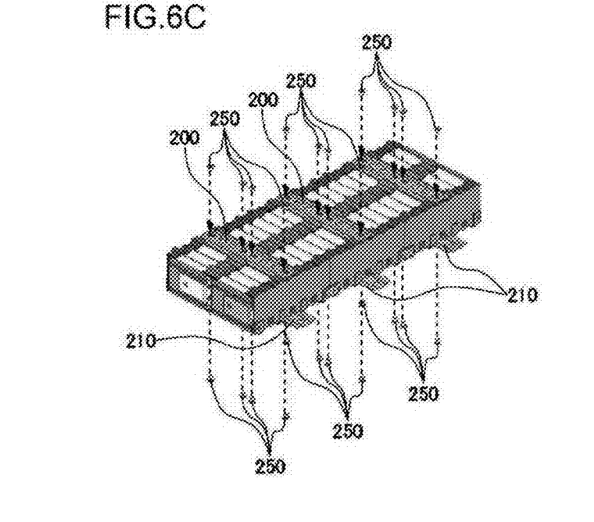

Then, as shown in FIG. 6C, on the longitudinal lateral surfaces that are to be the top face of the three sets of two-coupled battery modules 500b, the DIN rails 200 are fastened to the 2-2nd supporting member 16b, the 3-2nd supporting member 16c and the 4-2nd supporting member 16d with four screws 250. Also, on the longitudinal lateral surfaces that are to be the bottom face of the three sets of two-coupled battery modules 500b, the DIN rails 210 are fastened to three supporting members, which have the similar positional relations to those on the top face, with four screws 250.

Figure 6D:
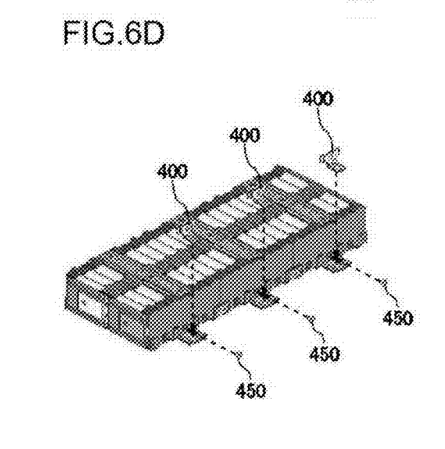

Then, as shown in FIG. 6D, on the longitudinal lateral surfaces that are to be the bottom face of the three sets of two-coupled battery modules 500b, one end of each DIN rail 210 (the right end thereof in FIG. 6D) protrudes externally from the two-coupled battery module 500b. The L-shaped mounting member 400 is mounted at a corner formed by the protruding part of each DIN rail 210 and a short lateral surface perpendicular to this protruding part thereof. More specifically, both side edges (both ends) of a planar portion in contact with a short lateral surface of the L-shaped mounting member 400 are respectively fitted into the recess formed in the 5-2nd guiding member 12e and the recess formed in the 5-3rd guiding member 13e. The mounting hole in this planar portion and the screw hole formed in the 5-2nd supporting member 16e are aligned to each other and then one screw 450 is inserted into the thus aligned holes so as to be fastened.

Figure 7A:
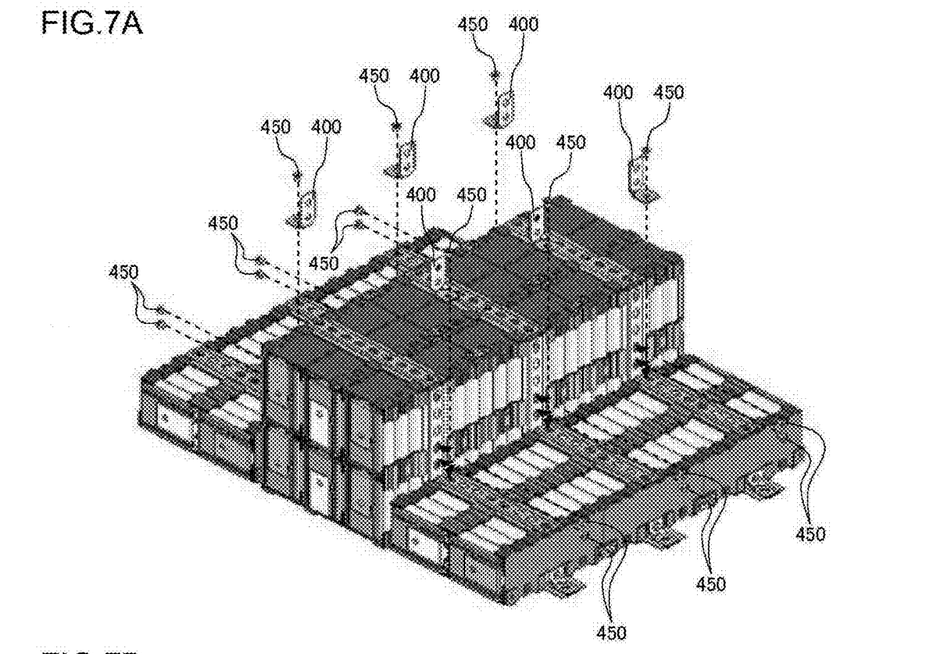
FIGS. 7A and 7B are diagrams for explaining a method for assembling the battery module shown in FIG. 5B.
Figure 7B:
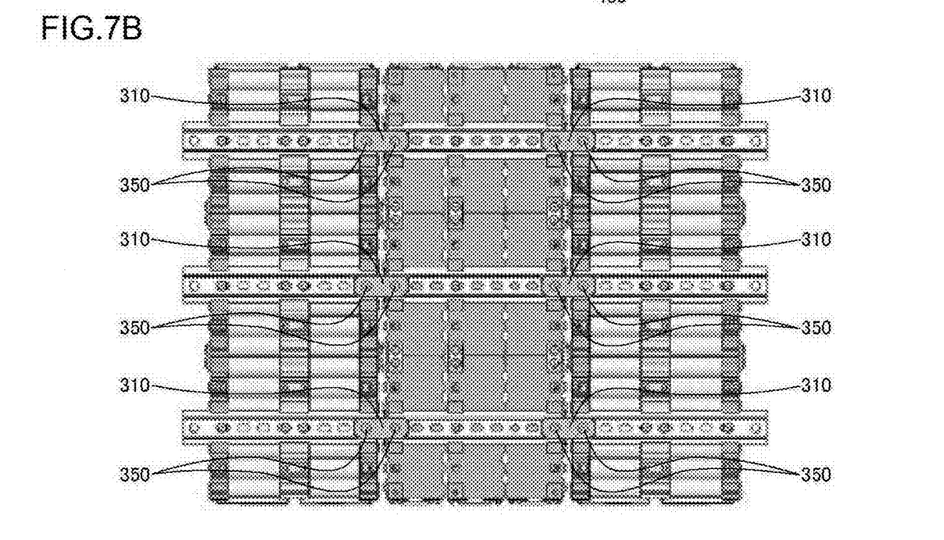

FIGS. 7A and 7B are diagrams for explaining a method for assembling the battery module 500f shown in FIG. 5B. As shown in FIG. 7A, two separate six-coupled battery modules 500e, each of which has been assembled as shown in FIG. 5A, are respectively arranged such that the short lateral surfaces of the six-coupled battery modules 500e come in contact with both the longitudinal lateral surfaces of the eighteen-coupled battery module 500d, respectively. The short lateral surfaces of the six-coupled battery module 500e where no DIN rails 210 protrude are made to contact with the longitudinal lateral surfaces of the eighteen-coupled battery module 500d.

The L-shaped mounting member 410 is mounted on the corner formed by the DIN rail 200, which is made to pass through on both of the longitudinal lateral surfaces of the eighteen-coupled battery module 500d, and the DIN rail 200, which is made to pass through on the longitudinal lateral surface of the six-coupled battery module 500e. The L-shaped mounting member 410 has two mounting holes in the planar portion, in contact with the DIN rail 200, on the eighteen-coupled battery module 500d side and has one mounting hole in the planar portion, in contact with the DIN rail 200, on the six-coupled battery module 500e side.

The two mounting holes of the L-shaped mounting member 410 in the planar portion, in contact with the DIN rail 200, on the eighteen-coupled battery module 500d side are so positioned and aligned as to cover the two mounting holes in the central portion of the DIN rail 200. The double mounting holes and two screw holes formed in the 3-2nd supporting member 16c are positioned and aligned and then two screws 450 are inserted into the thus aligned holes so as to be fastened. In an example shown in FIG. 7A, the L-shaped mounting members 410 are mounted at the total of six positions.

FIG. 7B is a bottom view of the battery module 500f as viewed from the bottom face. This bottom face is a surface that is to be the bottom face when the thirty-coupled battery module 500f is installed. A plate-type mounting member 310 is mounted such that the plate-type mounting member 310 coverts (i) a tip inside the DIN rail 210 that is made to pass through on a longitudinal lateral surface that is to be the bottom face of the six-coupled battery module 500e and (ii) a tip of the DIN rail 210 that is made to pass through on a short lateral surface that is to be the bottom face of eighteen-coupled battery module 500d. The plate-type mounting member 310 has two mounting holes.

One of the two mounting holes of the plate-type mounting member 310 is so positioned as to cover an innermost mounting hole of the DIN rail 210 that is made to pass through on the longitudinal lateral surface that is to be the bottom face of the six-coupled battery module 500e. The double mounting holes and screw holes formed in a supporting member to be mounted are positioned and aligned and then the screws 350 are inserted into the thus aligned holes so as to be fastened. The other of the two mounting holes of the plate-type mounting member 310 is so positioned as to cover an farthest-end mounting hole of the DIN rail 200 that is made to pass through on the short lateral surface that is to be the bottom face of the eighteen-coupled battery module 500d. The double mounting holes and screw holes formed in a supporting member to be mounted are positioned and aligned and then the screws 350 are inserted into the thus aligned holes so as to be fastened.

By employing the embodiments as described above, a plurality of battery blocks are coupled and combined by using the DIN rails, so that the packaging for the secondary batteries, which is rigid and highly flexible in combination of shape, can be realized. In contrast to this, in the comparative case where the battery module as shown in FIG. 1 where no DIN rails is used, it is normally practiced that a casing suitable for the shape of a battery module is prepared and then the battery module is contained therein and packaged accordingly in order that the coupling between the battery blocks is not disconnected.

If the battery module is of such a regular shape as shown in FIGS. 4A and 4B, it may be easily fit or contained in a certain casing. If, however, the battery module is of such an irregular shape as shown in FIG. 5B, it may not be easily fit or contained in a normal casing. Thus, in the conventional practice, the assembly shapes of the battery blocks need to be limited to a regular shape or the casings having a variety of shapes need to be prepared. The former makes it difficult to customize the shape of a battery pack suitable for an installation space, and the latter increases the cost of casings.

In view of such problems in the conventional practice, the use of DIN rails as described in the present embodiments allows a plurality of battery blocks to be assembled into an arbitrary shape while the rigidity thereof is ensured. The battery blocks can be coupled or combined in all directions along an X axis, a Y axis and a Z axis. The rigidity of an entire battery module can be improved as compared with the case where two battery blocks are coupled by fastening them with individual screws or like.

Also, the guiding members are provided in an orientation such that the DIN rails pass through in a direction parallel to the electrode surface on a longitudinal lateral surface and a short lateral surface. Also, the guiding members are provided in the positions along a single plane parallel to the electrode surface thereon. Hence, it is easy to couple and combine horizontally mounted battery block(s) and vertically mounted battery blocks.

The present invention has been described by referring to the embodiments and such description is for illustrative purposes only. It is understood by those skilled in the art that any arbitrary combinations of the constituting elements and processes could be developed as modifications and that such modifications are also within the scope of the present invention.

The features and characteristics of the present invention described based on the above-described embodiments may be defined by the following Item 1 to Item 3:

[Item 1]

A battery block formed by a plurality of unit cells arranged, wherein a guiding member, through which a rail is made to pass, is provided on an external surface of the battery block, the rail being used to couple the battery block with another battery block.

[Item 2]

A battery block according to Item 1, wherein the battery block is formed in a rectangular parallelepiped shape, and wherein the guiding members are provided on at least two adjacent faces of four faces of the battery block excluding two faces, positioned opposite to each other, on which a cathode external terminal and an anode external terminal thereof are arranged, respectively.

[Item 3]

A battery block according to Item 2, wherein the guiding member is provided in an orientation such that the rail passes through in a direction parallel to a face where each of the cathode external terminal and the anode external terminal is arranged on each of their mounting surfaces, and the guiding member is provided in a position where distances between the guiding members and the face having either the cathode external terminal or the anode external terminal are equal.

DESCRIPTION OF THE REFERENCE NUMERALS

100 Battery block
500a, 500b, 500c, 500d, 500e, 500f Battery module
10a First bracket
10b Second bracket
10c Third bracket
20a, 20b Lid member
30a, 30b Cathode external terminal member
11a First guiding member
12a Second guiding member
13a Third guiding member
14a Fourth guiding member
15a First supporting member
16a Second supporting member
17a Third supporting member
200, 210 DIN rail 250 Screw
300 Plate-type mounting member
310 Plate-type mounting member
350 Screw
400, 410 L-shaped mounting member
450 Screw

INDUSTRIAL APPLICABILITY

The present invention can be used for an in-vehicle secondary battery and an electric storage system.

What is claimed is:

1. A cell module comprising:
a plurality of battery blocks, each including a plurality of unit cells arranged together; first guiding members on respective first external surfaces of
the plurality of battery blocks and located on the same plane when the plurality of blocks are arranged such that unit cells are aligned in a first direction;
second guiding members on respective second external surfaces of the plurality of battery blocks adjacent to respective first external surfaces and located on the same plane when the plurality of blocks are arranged such that unit cells are aligned in a second direction substantially perpendicular to the first direction; and
a rail received by the first guiding members when the plurality of blocks are arranged such that unit cells are aligned in the first direction and coupling the plurality of battery block to each other, and received by the second guide members when the plurality of blocks are arranged such that unit cells are aligned in the second direction and coupling the plurality of blocks to each other.

2. The cell module according to claim 1, wherein the plurality of unit cells are arranged in a rectangular parallelepiped shape, and
wherein the first and second guiding members each include portions provided on at least two opposing faces of the battery block, on which a cathode external terminal and an anode external terminal thereof are arranged, respectively.

3. The cell module according to claim 2, wherein the first and second guiding members are each provided in an orientation such that the rail passes through in a direction parallel to a face where each of the cathode external terminal and the anode external terminal is arranged on each of their mounting surfaces, and
the first and second guiding member members are each provided in a position where distances between the guiding members and the face having either the cathode external terminal or the anode external terminal are equal.

4. The cell module according to claim 1, wherein the first and second guide members are on brackets fitted to the plurality of battery blocks, each of the brackets includes a planar portion and a gripper portion extending from sides of the planar portion, and the first guiding members are on the gripper portion and the second guiding members are on the planar portion.

* * * * *